Sept. 15, 1925.
J. K. E. DIFFENDERFFER
ACETYLENE GENERATOR
Filed June 27, 1921  2 Sheets-Sheet 2
1,553,517
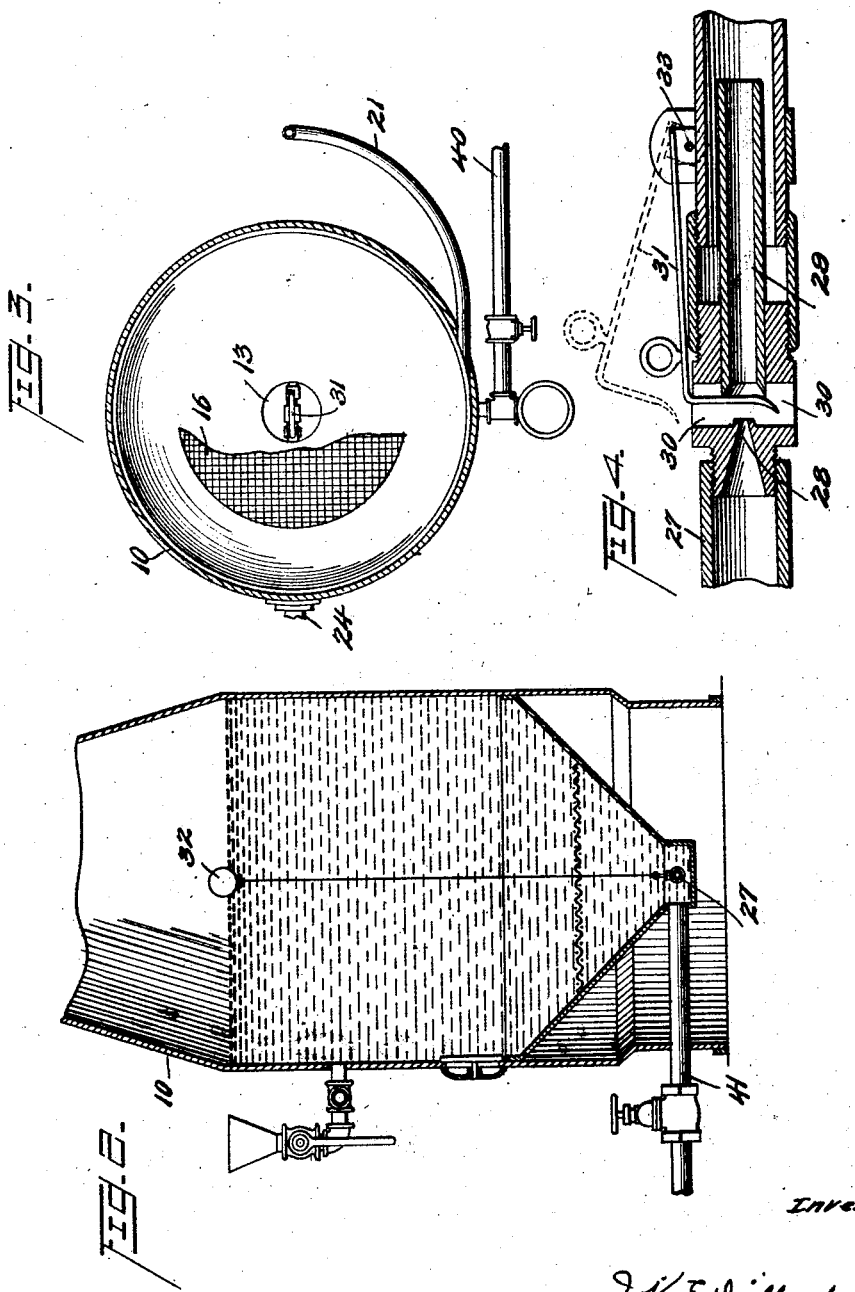

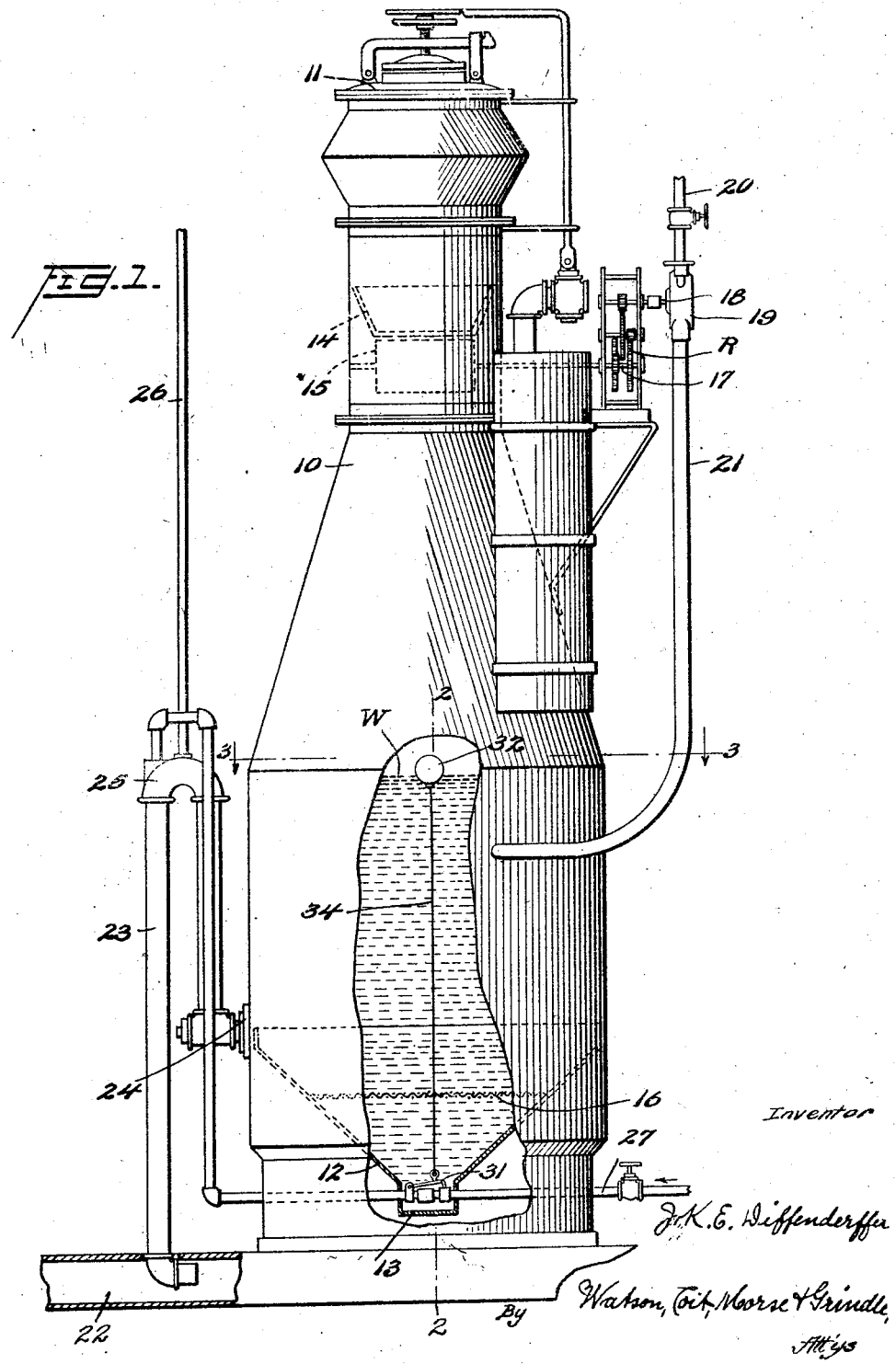

Patented Sept. 15, 1925.

1,553,517

UNITED STATES PATENT OFFICE.

JOHN K. E. DIFFENDERFFER, OF BALTIMORE, MARYLAND, ASSIGNOR TO ALEXANDER-MILBURN COMPANY, OF BALTIMORE, MARYLAND, A CORPORATION OF MARYLAND.

ACETYLENE GENERATOR.

Application filed June 27, 1921. Serial No. 480,750.

*To all whom it may concern:*

Be it known that I, JOHN K. E. DIFFENDERFFER, a citizen of the United States and resident of Baltimore, Maryland, have invented certain new and useful Improvements in Acetylene Generators, of which the following is a specification.

The present invention relates to gas generating apparatus and particularly to apparatus utilized in the formation of acetylene gas in large volumes.

In factories and manufacturing plants in which large quantities of acetylene are used for supplying cutting and welding torches or for lighting purposes, gas generators of large size are installed, these generators being usually automatic in their operation and adapted to operate continuously through long periods of time without requiring the services of an attendant. Automatic means is provided for feeding the carbide or similar substance into the tank and for supplying the necessary water thereto, and automatic means is provided for allowing the escape of sludge and water from the bottom of the tank. Heretofore manually operable valves have generally been provided at the tank bottom adapted to be opened from time to time to permit the water and sludge to escape into a suitable waste pipe, owing to the difficulties met with in providing a satisfactory automatic device for this purpose. The advantages of having automatic feeding means for water and carbide are largely lost where the exhaust means for the sludge and water is manually controlled.

In accordance with the present invention an efficient and automatically acting means is provided for removing the sludge and water from the bottom of the tank so that the entire operation of the apparatus is automatic and it is only necessary to manually replenish the carbide from time to time.

The invention may be embodied in various forms one of which is illustrated in the accompanying drawings by way of example. In the drawings, Figure 1 is an elevation of a gas generating apparatus partly broken away to show the automatic sludge and water removing means;

Figure 2 is a section through the lower portion of the tank along line 2—2 of Fig. 1;

Figure 3 is a section on line 3—3 of Fig. 1, and

Figure 4 is a longitudinal section through the sludge ejecting means.

The apparatus is in general of well known form comprising a tank 10, which is water and gas tight, having a feeding opening for carbide at the top closed by a gas tight cap 11 and a conical bottom or hopper 12 for collecting the sludge and guiding it to a central collecting cup or sump 13. The carbide is fed from the carbide hopper, illustrated at 14 in dotted lines, on to a constantly revolving drum, illustrated at 15 in dotted lines, and drops from this drum into the water, the level of which stands at W. The gas generated passes out through suitable piping, not shown in detail, and the sludge or residue from the carbide passes downwardly and gathers upon the conical bottom 12 and principally in the sump 13. A screen 16 intercepts any lumps of carbide passing through the water and retains them until they are dissolved to such an extent that the carbide may pass through the fine mesh of the screen.

The carbide feeding means may be of any well known type, but is preferably similar to that disclosed in the co-pending application of A. F. Jenkins Serial No. 347,719, filed Dec. 27, 1919, the rotatable drum 15 being mounted upon a shaft 17 which extends laterally through the wall of the tank and the outer end of which is operatively connected through reducing gearing R to the shaft 18 of a rotary water motor 19. The inlet pipe 20 of the water motor is connected to a suitable source of water supply under pressure, as for instance to a city water main, and the outlet pipe 21 which is considerably larger in size than the inlet pipe, leads downwardly and enters the tank 10 substantially at a tangent thereto and below the normal water level W.

Below the tank is positioned the waste conduit 22 for exhaust water and sludge which conduit may be common to a number of generating units if desired, and connecting the tank and waste conduit is the overflow pipe 23 formed as an inverted U. This pipe has its inlet opening at 24, a considerable distance above the sump 13 and the U-shaped elbow is positioned at a level at which it is desired that the water in the tank shall lie. Pipe 23 is of relatively large size as compared with the inlet pipe and will readily lead off all water necessary to keep the water level in the tank at the desired point. The top of the U-shaped elbow 25 is open to the atmosphere a pipe 26 having an open upper end being provided to supply air to prevent the formation of a vacuum in the overflow pipe 23 such as might possibly occur under some circumstances, and the establishment of a syphon action which might empty the tank.

Extending through the supporting walls of the tank and through the sump 13 is a water pipe 27 which may be connected to any source of water under pressure such as a city water main, and which has its outlet in the overflow pipe. An ejector is positioned in the sump 13 and is connected in pipe 27 so that its nozzle 28 is supplied with water under pressure, the jet of water issuing from this nozzle passing down the flaring combining tube 29 and entraining water and sludge from the sump, which enter the ejector through the suction conduits 30. After passing from tube 29 the sludge and water continue along the pipe 27 and finally are discharged into the overflow pipe 23 at the elbow 25.

This ejector is preferably designed so as to remove water and sludge from the tank at a rate considerably greater than that at which water enters through pipe 21. In order therefore that the ejector be prevented from emptying the tank a gate valve 31 is provided, controlled by a float 32, and this valve governs the operation of the ejector. Referring particularly to Fig. 4 it will be seen that valve 31, which comprises an L-shaped plate pivotally supported at 33 and connected to float 32 by a wire 34, has a downwardly extending end which is adapted to move downwardly into suction conduit 30 and to intercept the jet issuing from nozzle 28. The end of this downwardly extending portion is curved toward the nozzle and the force of the jet issuing therefrom and impinging on the face of the valve tends to keep the valve in its closed position and to cause the water of the jet to rush upwardly and downwardly through the suction conduits 30 and into the tank, causing eddies and disturbances therein which act to keep the sludge stirred up so that it will readily flow to the sump.

The jet flowing from nozzle 28 however, together with the water entering the tank through pipe 21, quickly raises the water level and finally the upward pull of the float 32 is sufficient to overcome the downward force exerted by the jet on the valve and the valve moves suddenly upward to dotted line position (Fig. 4). The jet then enters the combining tube 29 and entrains water and sludge through suction conduits 30 and the level of the water in the tank again begins to fall. As the float falls the lower edge of valve 31 approaches the jet issuing from nozzle 28 and when the inclined lower margin of the valve comes in front of the jet the valve is quickly snapped down to closed position due to the great force of the jet, dragging the float downwardly through a short distance with it. The valve remains closed until the water level has again risen and the float has sufficient pull to raise it. This cycle of operations is continually repeated thereby effecting an entirely automatic and thoroughly efficient removal of the sludge from the generating tank.

An auxiliary water inlet pipe is indicated at 40 and an auxiliary outlet pipe at 41. Normally each of these pipes is closed by a valve but they are ready to be used when the automatic water feeding and exhausting means are not in use.

It is obvious that the design and arrangement of the ejecting device and other parts of the invention may be modified and the invention is therefore not limited to the exact form described and illustrated.

Having described the invention what is claimed as new and desired to be secured by Letters Patent is:

1. The combination with a gas generating tank of the class described, of an ejecting device for removing sludge and waste water, and means for controlling the operation of the ejecting device in accordance with the depth of liquid in the tank.

2. The combination with a gas generating tank of the class described, of an ejecting device for removing sludge and water therefrom and a valve for controlling the operation of the ejecting device in accordance with the depth of liquid in the tank.

3. The combination with a gas generating tank of the class described, of an ejecting device for removing sludge and water therefrom, said device having a nozzle for forming a jet, and a valve movable to a position in front of said nozzle to interrupt the jet and to a position adjacent the nozzle to permit the jet to pass unbroken.

4. The combination with a gas generating tank of the class described, of an ejecting device for removing sludge and water therefrom, said device having a nozzle for forming a jet, and a valve movable to a position in front of said nozzle to interrupt the jet and to a position above the nozzle to permit the jet to pass unbroken and means for controlling the position of the valve in accordance with the level of liquid in the tank.

5. The combination with a gas generating tank of the class described, of an ejecting device for removing sludge and water therefrom, said device having a combining tube, a suction conduit, a nozzle, and means for causing the jet to flow outwardly through the suction conduit, or through the combining tube.

6. The combination with a gas generating tank of the class described adapted to contain a liquid, of an ejecting device for removing sludge and water therefrom, said device having a combining tube, a suction conduit, a nozzle, and means controlled by the depth of liquid in the tank for causing the jet to flow outwardly through the suction conduit, or through the combining tube.

7. The combination with a gas generating tank of the class described adapted to contain water, of an ejecting device for removing sludge and water therefrom, said device having a combining tube, a suction conduit, a nozzle, a valve for causing the jet to flow outwardly through the suction conduit, or through the combining tube and a float resting upon the level of the water in the tank and connected to the valve for controlling the operation thereof.

8. The combination with a gas generating tank of the class described, of an ejecting device for removing sludge and water therefrom, said device having a combining tube, a suction conduit, a nozzle, a valve for causing the jet to flow outwardly through the suction conduit, or through the combining tube, said valve being movable transversely across the jet and being formed with a portion inclined to the axis of the jet so that the force of the jet normally tends to keep the valve in position to close the combining tube.

In testimony whereof I hereunto affix my signature.

JOHN K. E. DIFFENDERFFER.